United States Patent [19]

Yamada

[11] Patent Number: 4,965,950
[45] Date of Patent: Oct. 30, 1990

[54] DISPLAY DEVICE FOR AUTOMOTIVE MARK PLATE

[75] Inventor: Atsushi Yamada, Shizuoka, Japan

[73] Assignee: Koito Manufacturing Co., Ltd., Tokyo, Japan

[21] Appl. No.: 171,722

[22] Filed: Mar. 22, 1988

[30] Foreign Application Priority Data

| Mar. 23, 1987 | [JP] | Japan | 62-40821[U] |
| Jul. 7, 1987 | [JP] | Japan | 62-103350[U] |
| Sep. 18, 1987 | [JP] | Japan | 62-141662[U] |
| Sep. 18, 1987 | [JP] | Japan | 62-232503 |
| Feb. 12, 1988 | [JP] | Japan | 63-28920 |

[51] Int. Cl.$^5$ ............................................. G09F 13/18
[52] U.S. Cl. ................................... 40/546; 362/31
[58] Field of Search ................ 40/546, 544; 362/31, 362/61, 80

[56] References Cited

U.S. PATENT DOCUMENTS

| 2,347,665 | 5/1944 | Christensen et al. | 40/546 |
| 3,698,793 | 10/1972 | Tellerman | 40/546 |
| 4,373,282 | 2/1983 | Wrag | 40/546 |

FOREIGN PATENT DOCUMENTS

| 3208162 | 7/1982 | Fed. Rep. of Germany | 362/31 |
| 31104 | 11/1926 | France | 362/31 |
| 251884 | 2/1927 | Italy | 40/205 |

Primary Examiner—Kenneth J. Dorner
Assistant Examiner—Joanne Bonifanti
Attorney, Agent, or Firm—Sughrue, Mion, Zinn, Macpeak & Seas

[57] ABSTRACT

In a display device such as a mark plate of an automobile, a light conducting member is arranged on the rear surface of a display panel held on a case. A pair of light incident portions are formed at the right and left ends, and a pair of light sources are mounted in the light incident portions. A number of stipples are formed in the rear surface having a greater concentration towards the middle from the right and left ends. The rear surface of the light conducting member is bent inwardly so that the member is smaller in thickness towards the middle from the right and left ends, whereby the display device is small in thickness and the display region of the display panel is uniformly illuminated.

7 Claims, 4 Drawing Sheets

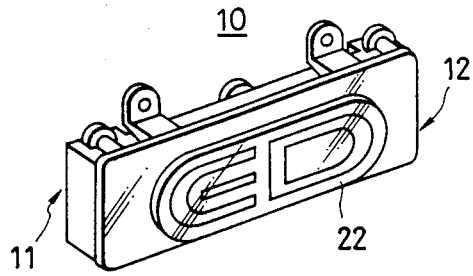
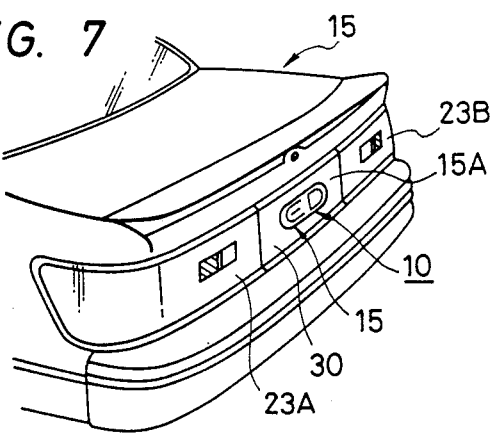
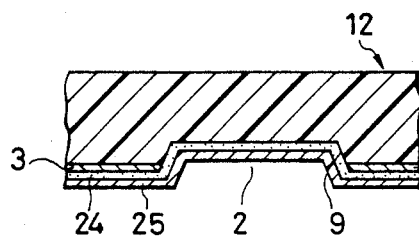
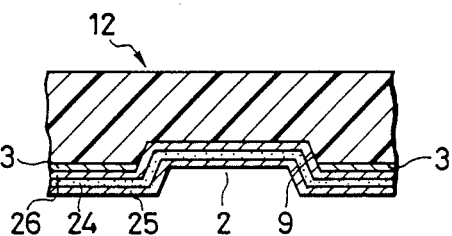
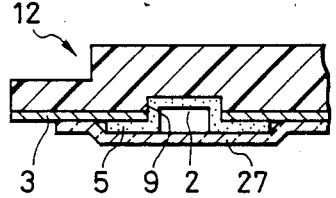
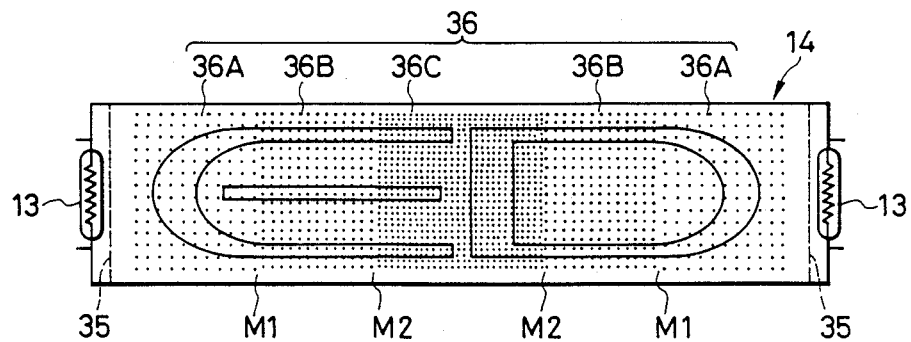

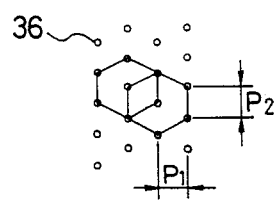
FIG. 10A
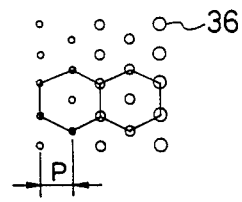
FIG. 10B
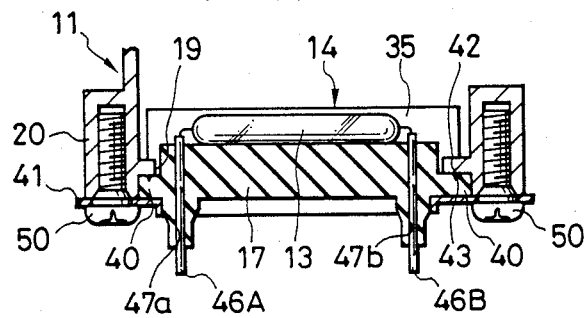
FIG. 11
FIG. 12
FIG. 14
FIG. 15

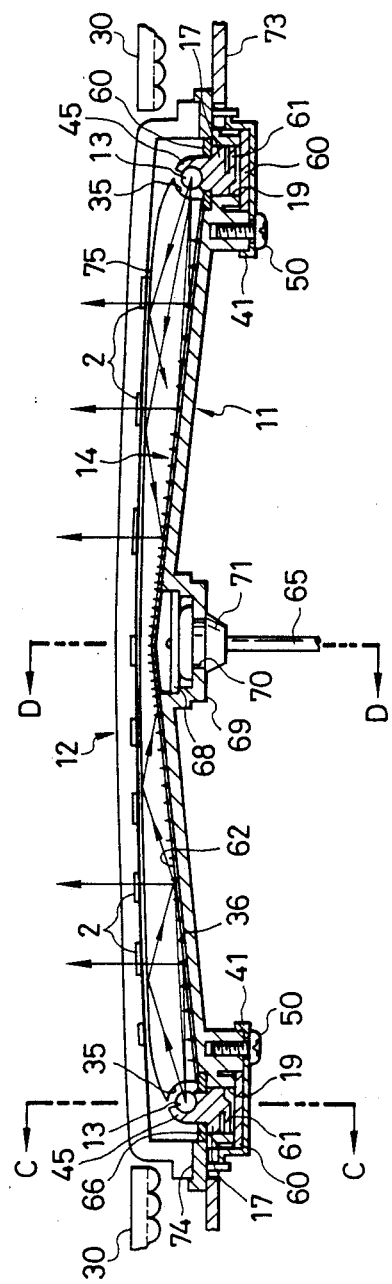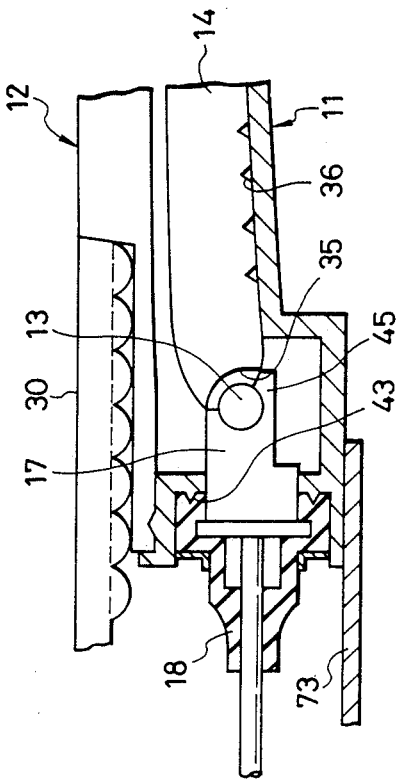

DISPLAY DEVICE FOR AUTOMOTIVE MARK PLATE

BACKGROUND OF THE INVENTION

The present invention relates to a display device suitable as an internal illumination type mark plate for an automobile or the like.

Often in recent automobiles a symbol mark, indicating the manufacturer or model of the vehicle, is illuminated at night not only to improve the external appearance and the recognition of the automobile but also to emphasize the luxuriousness of the vehicle and to distinguish it from others. A conventional display device for displaying a symbol mark in this manner employs a half-silvered mirror with which during the daytime external light (sunlight) is reflected so that the symbol looks as it were a metallic mark and which at night is used for rear illumination.

An example of a conventional display device, namely, a mark plate, is constructed as shown in FIGS. 1 and 2. In these figures, reference numeral 1 designates a display panel made of a translucent material such as transparent resin, smoked resin or glass, and 2, mark regions (display regions) provided on the rear surface of the display panel 1. The rear surface of the display panel 1, except for the display regions 2 is covered with a light shielding film layer 3 which is, for instance, black in color, thus providing a background color layer 4. Suitable colored layers 5 are formed over the mark regions 2.

Further in FIGS. 1 and 2, reference numeral 6 designates a light source for illuminating the mark regions 2 from behind, and 7, a mirror body provided behind the display board 1 which supports the light source 6.

If, in the conventional mark plate, the display panel 1 is large, then it is difficult to uniformly illuminate the mark regions 2 in their entirety. On the other hand, in the conventional mark plate of the back illumination type, the thickness is considerably large, and a part accommodating the external wiring protrudes rearward, thus further increasing the thickness of the mark plate. Thus, there has been a strong demand for reducing the thickness of the mark plate.

SUMMARY OF THE INVENTION

Accordingly, an object of the invention is to eliminate the above-described difficulties accompanying a conventional display device such as a mark plate of an automobile.

More specifically, an object of the invention is to provide a display device which is small in thickness and can illuminate the entire display region uniformly.

The foregoing object and other objects of the invention have been achieved by the provision of a display device which, according to the invention, comprises: a case having an opening on the front side thereof; a display panel having a display region, the display panel being coupled to the case in such a manner as to cover the front opening of the case; a light conducting member arranged on the rear surface of the display panel, the light conducting member having a pair of light incident portions provided at both ends thereof, and a number of stipples formed in the rear surface thereof with the stipples being greater in concentration towards the middle of the light conducting member from the two ends where the light incident portions are located; and a pair of linear light sources arranged in the respective light incident portions, the rear surface of the light conducting member being substantially V-shaped in section so that the light conducting member is smaller in thickness towards the middle thereof from the two ends where the light incident portions are located.

The manner in which the foregoing and other objects are achieved by the invention will become more apparent from the following detailed description when read in conjunction with the accompanying drawings.

BRIEF DESCRIPTION OF THE DRAWINGS

In the accompanying drawings:

FIG. 6 is a perspective view of the mark plate;

FIG. 7 is a perspective view showing related components of an automobile;

FIGS. 8A, 8B and 8C are sectional views showing examples of the structure of a mark region of the display panel;

FIG. 9 is a rear view of a light conducting member in the mark plate;

FIGS. 10A and 10B are explanatory diagrams showing examples of the arrangement of stipples on the light conducting member;

FIG. 11 is an enlarged sectional view showing an example of a socket the mark plate;

FIG. 12 is a sectional view showing a wiring receiving through-hole in the socket;

FIG. 13 is a sectional view showing a second example of a mark plate according to the invention;

FIG. 14 is a sectional view taken along a line C—C in FIG. 13;

FIG. 15 is a sectional view taken along a line D-D in FIG. 13; and

FIG. 16 is a sectional view showing essential components of a third example of a mark plate according to the invention.

DESCRIPTION OF THE PREFERRED EMBODIMENTS

Figure 1:
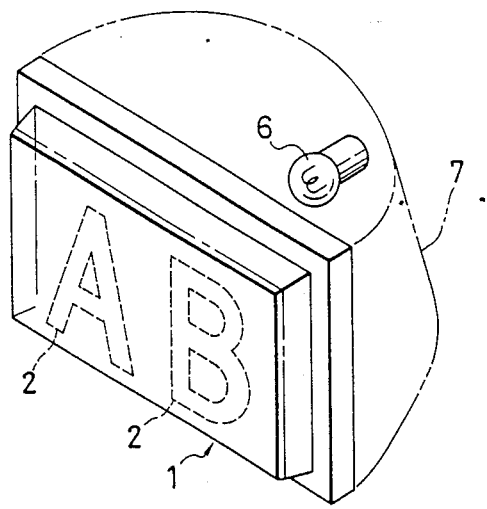
FIG. 1 is a perspective view showing an example of a conventional mark plate.
Figure 2:
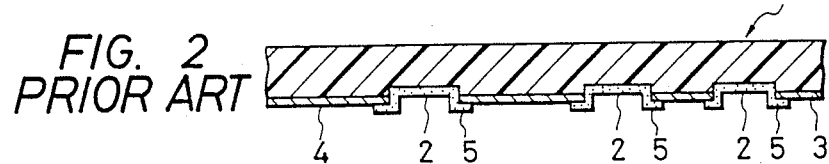
FIG. 2 is a sectional view showing essential components of a display panel in the conventional mark plate.

A first preferred embodiment of the invention will be described with reference to FIGS. 3 through 8C.

As shown in these figures, a mark plate 10 includes a case 11 which is in the form of a horizontally elongated box relatively small in height and with one side open, a display panel 12 mounted on the case 11 in such a manner as to close the opening, a pair of light sources 13 arranged on the right and left sides in the case 11, and a light conducting member 14. The mark plate 10 is mounted on the rear of an automobile 15 at the center.

Figure 3:
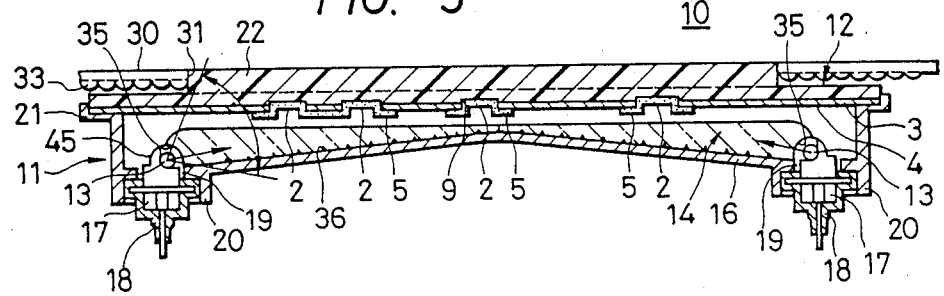
FIG. 3 is a sectional view, taken along a line A—A in FIG. 4, showing a first example of a mark plate to which the technical of the invention is applied.

The case 11, which is made of a resin, has a rear plate 16 which is inverted-V shaped in section (FIG. 3). Therefore, the thickness of the case 11 increases from the center towards the right and left ends. A pair of socket mounting parts 20 each having a socket mounting hole 19 are formed at the right and left end portions of the rear plate 16. Sockets 17 holding the light sources 13 are inserted into the respective socket mounting holes 19. A display panel mounting part 21 in the form of a flange extends outwardly from the periphery of the opening of the case 11. The peripheral portion of the display panel 12 is fitted in the display panel mounting part 21 and is fixedly secured to the latter, for instance, by ultrasonic welding. The sockets 17 are covered with corresponding waterproof rubber members 18.

Figure 4:
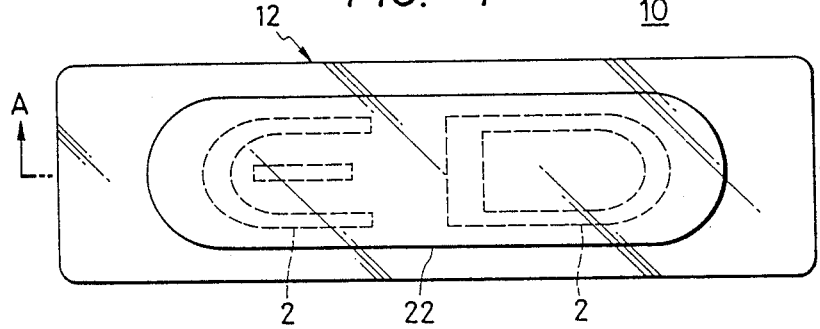
FIG. 4 is a front view of the mark plate of FIG. 3.
Figure 5:
FIG. 5 is a side view of a display panel in the mark plate.

The display panel 12, which is made of a transparent resin, has the form of a horizontally elongated plate, as shown in FIG. 4. The display panel 12 has a horizontally elongated protrusion 22 at the center of the front surface. Mark regions (display regions) 2 for displaying the characters "E" and "D", for instance, are provided in the rear surface positioned well balanced in the protrusion 22. The rear surface of the display panel 12 except for the mark regions is a continuous planar surface on which a light shielding film 3 is formed, thus serving as a background color member 4.

Translucent metal particle layers 5 are formed on the mark regions 2 by vacuum deposition or by sputtering. In the formation of the metal particle layers 5, metal particles such as gold powder are vacuum-deposited in such a manner that the particles are suitably spaced away from each other and the thickness is considerably small, of the order of 300 to 400 Å. Therefore, the layers 5 are translucent.

Further in FIG. 3, reference numeral 9 designates recesses defining the mark regions 2. In FIG. 7, 23A and 23B designate lenses for the tail lamp of the automobile.

The invention is not limited to the above-described mark displaying arrangement, that is, the display device can be modified in various manners as described below.

FIGS. 8A, 8B and 8C show other examples of the mark displaying arrangement. In the mark displaying arrangement shown in FIG. 8A, the mark region 2 is covered with an aluminum film layer 24, and the layer 24 is covered with a top coating layer 25. In the arrangement shown in FIG. 8B, a three-layer structure composed of a colored paint layer 26, an aluminum film layer 24 and a top coating layer 25 is formed over the mark region 2. In the arrangement shown in FIG. 8C, the metal particle layer 5 formed over the mark region 2 is covered with an optical diffusion layer 27.

Similar to the case of the metal particle layer 5, the aluminum film 24, the top coating layer 25, the colored paint layer 26 and the optical diffusion layer 27 are translucent. The optical diffusion layer 27 is formed by printing a transparent sheet in white or other color. Alternatively, a milky white sheet can be employed directly or printed in color.

It is desirable that the color of the mark be the same or substantially the same as the color of the automobile body, or alternatively a safety color, e.g., green.

The display panel 12 thus formed is installed in close contact with the rear surface of a decorative plate 30 forming the rear panel 15A of the automobile 15 (FIG. 7). As shown in FIG. 3, the decorative plate 30 has an elongated hole 3 in which the protrusion 22 of the display panel 12 is fitted in such a manner that the protrusion 22 is flush with the decorative plate 30.

The decorative plate 30 has a number of diffusion lenses 33, namely, small convex lenses, on its rear surface arranged side by side in a high concentration, whereby it is seen as if it were integral with the tail lamp lenses 23A and 23B adjacent thereto.

The light conducting member 14, which is made of acrylic resin, has the form of a horizontally elongated plate. Its front surface is a planar surface, while its rear surface is a bent inverted-V shape (FIG. 3) so that it mates well with the front surface of the bottom plate 16 of the case 11. In other words, the thickness of the light conducting member 14 is larger from the center towards the right and left ends. Light incident portions 35, which are grooves semicircular in section, are formed in the right and left end portions of the light conducting member 14 in such a manner that they extend along the right and left ends of the member 14. The light sources 13 are positioned in the light incident portions 35.

A number of small conical recesses or stipples 36 are formed in the rear surface of the light conducting member 14, as shown in FIG. 3. The stipples 36 reflect light entering the light conducting member 14 from the light sources 13 provided at the light incident parts 35 and cause the light to emerge from the front surface of the light conducting member 14. The stipples 36, as shown in FIG. 9, are arranged so that their concentration is larger from the center towards the right and left ends so that all regions on the front surface of the member 14 are uniform in the amount of illumination per unit area.

In the case of FIG. 9, the concentration of stipples is changed stepwise; that is, the light conducting member 14 has a first group of stipples 36A arranged at intervals of "2", both in the horizontal direction and in the vertical direction ($P = 2 \times 2$), a second group of stipples 36B arranged at intervals of "1.5" ($P = 1.5 \times 1.5$), and a third group of stipples 36C arranged at intervals of "1" ($P = 1 \times 1$).

FIGS. 10A and 10B show other examples of the light conducting member in which the concentration of stipples is smoothly changed. In the case of FIG. 10A, the fundamental pattern of stipples 36 is a regular hexagon with the size of the stipples being constant and with pitches $P_1$ and $P_2$ gradually changing. In the case of FIG. 10B, the fundamental pattern of stipples 36 is a regular hexagon, similar to the case of FIG. 10A and with the pitch P being constant, the stipples 36 being smaller in size towards the light source.

In the case of FIG. 9, the concentration of stipples changes stepwise at the border lines $M_1$ and $M_2$ between groups of stipples. The luminance changes abruptly near these border lines. On the other hand, the light conducting members shown in FIGS. 10A and 10B are free from this difficulty, thus being suitable for large mark plates. The above-described regular hexagonal pattern of stipples is advantageous in that, in a relatively small area of the light conducting member, the illumination is uniform. Furthermore, the number of stipples per unit area is 1.15 times that in the case where a rectangular pattern of stipples is employed, and therefore in the minimum pitch region. That is, in the middle portion of the light conducting member, the number of stipples can be increased or, in other words, the range of variation of the concentration of stipples can be made larger than in the case where a rectangular pattern is used.

Each of the light sources 13, as shown FIGS. 9, and 11, includes an electric light bulb (linear light source) held by a socket 17, with the light sources 13 being arranged in the respective light incident portions 35 of the light conducting member 14 extending parallel to the light incident portion 35.

A light beam from each of the light sources 13 enters the light conducting member 14 through the light incident portion 35. A part of the light beam strikes the stipples 36, thus emerging from the front surface of the light conducting member to illuminate the mark region 2, while the remaining part is repeatedly reflected between the front and rear surfaces of the light conducting member 14. As described above, the rear surface of the light conducting member 14 is sloped. Therefore, when upon being repeatedly reflected in the above-described manner, the remaining part of the light beam exceeds the critical angle, the light emerges from the front surface of rear surface of the light conducting member 14. The light emerging from the front surface illuminates the mark region 2, whereas the light emerging from the rear surface is reflected by the inner surface of the bottom of the case 11 into the light conducting member 14 so that it is utilized again. Thus, the display device of the invention is high in light utilization efficiency, and thus provides good illumination. The inner surface of the bottom of the case 11 is painted white, for instance, so that the light advancing towards the case 11 is reflected into the light conducting member 14.

The linear light source 13, when compared with an ordinary point light source such as a light bulb, is advantageous in that the most effectively utilized solid angle $\alpha$ (FIG. 3) of the light incident portion 35 can be made large. Because of this, the quantity of light entering the light conducting member 14 is increased; that is, the illumination effect can be improved. The light incident portion 35 is formed with curved surface which covers the tube of the linear light source 13 along the solid angle $\alpha$. In this case, the solid angle $\alpha$ is uniform over substantially the entire length of the light incident portion 35.

FIGS. 11 and 12 show another example of the socket 17, which is made of rubber so that the waterproof cover 18 shown in FIG. 1 can be eliminated. The socket 17 has a flange 40 extending from its periphery. The socket 17 is fitted in the socket mounting part 20 of the case 11 from behind, and the flange 40 is fixedly secured to the rear surface of the case 11 with a set plate 41.

A water-draining annular groove 42 is formed in the front surface of the flange 40, and a water-draining protrusion 43 is formed on the rear surface of the case. The annular groove 42 is engaged with the protrusion 43 so that the socket mounting hole 19 and the socket 17 are maintained watertight.

The front end portion of the socket 17 is inserted into the case 11 through the socket mounting hole 19, and a substantially semicircular reflecting panel 45 (FIG. 3) extends from the front surface of the front end portion of the socket 17 in such a manner as to cover the side of the light source 13 opposite the side on which the light conducting member 14 is provided. The reflecting board 45 reflects light which advances from the light source 13 outwardly of the display device to cause it to enter the light conducting member 14 through the light incident portion 35.

A pair of wire accommodating through-holes 47a and 47b are formed in both end portions of the socket 17, and wires 46A and 46B are inserted into the through-holes 47a and 47b, respectively. The entrance of rain water into the case 11 through the through-holes 47a and 47b is prevented by causing the water-draining protrusions 49 formed on the inner walls of the through-holes 47a and 47b to nip the respective wires 46A and 46B.

In FIG. 11, reference numeral 50 designates screws used to fixedly secure the set plate 41 to the case 11.

As described above, in the mark plate 10 thus constructed, the rear surface of the light conducting member 14 is bent substantially in a V-shape in such a manner that the thickness of the light conducting member 14 is larger from the center towards the right and left ends, as a result of which the light in the light conducting member is less absorbed. Furthermore, tubular lamps are employed as the light sources 13 and the stipples 36 are arranged in the light conducting member 14 with a variable concentration, as a result of which the light emerging from the front surface of the light conducting member 14 is substantially equal in intensity throughout the surface. Thus, the mark regions 2 of the display panel 12 are uniformly illuminated. Since the rear surface of the light conducting member 14 is sloped, the light reflecting between the front and rear surface of the member 14 finally exceeds the critical angle and emerges from the front surface to illuminate the mark region 2. Thus, the mark plate 10 achieves a high light utilization efficiency and can produce illumination with high luminance, thus contributing to an improvement of the external appearance and the security of the automobile.

As described above, the light sources 13 are provided on the two sides of the light conducting member 14. Therefore, the light sources 13 need not protrude rearward of the light conducting member, thus permitting the mark plate 10 to be made small in thickness and in overall size. In the mark plate 10, because the light sources 13 are tubular lamps, the effectively utilizable solid angle $\alpha$ is larger than in the case where point light sources are used. This contributes to the more effective use of light in the mark plate. Furthermore, the reflecting panels 45 of the sockets 17 also contribute to improved effective use of light. As a result, the mark plate of the invention is higher by about 170% in average luminance than the conventional mark plate.

A second embodiment of the invention will be described with reference to FIGS. 13 through 15, in which those components which have been already described with reference to FIGS. 3 through 12 are therefore designated by the same reference numerals or characters.

In FIGS. 13 through 15, reference numeral 60 designates rubber packings, each disposed between the socket 17 and the set plate 41, and 61, tongue-shaped knobs protruding from the rear surface of the respective socket 17. The knob 61, after being folded, is inserted into the socket mounting hole 19. When, in replacing the light bulb, the set plate 41 and the rubber packing 60 are removed from the socket mounting part 20, the tongue-shaped knob 61 elastically protrudes outwardly, thus facilitating the removal of the socket 17 and the light source.

A flexible printed circuit board 62 for electrically connecting the light sources 13 to an external wire 65 is interposed between the inner surface of the bottom of the case 11 and the light conducting member 14. The surface of the circuit board 62 is covered with a white reflecting sheet (not shown).

The circuit board 62 is electrically connected to the light sources 13 as follows: As shown in FIG. 14, pins 67 are press-fitted into liner plates 66 provided on the rear surfaces of both end portions of the panel 62, and the lead wires 46A and 46B of the light source 13 are connected to the pins 67 on the rear surface side of the socket 17.

The flexible printed circuit board 62 is connected to the external wire 65 as follows: As shown in FIG. 15, the conductors of the wire 65 are inserted into a liner plate 68 bonded to the rear surface of the middle portion of the printed circuit board 62, and the tops of the conductors are soldered to the electrical circuit of the board 62.

A wire accommodating and fixing part 69 protrudes from the center of the bottom of the case 11. The part 69 has a through-hole 70 for leading the wire to the outside. The wire is fixed in the through-hole 70 with a bushing. The liner plate 68 is fixedly secured with bosses 72 extending into the part 69.

In FIG. 13, reference numeral 73 designates a vehicle body, 74, a gasket, and 75, a colored filter interposed between the display panel 12 and the light conducting member 14.

In the mark plate thus constructed, the wire accommodating and fixing part 69 is provided at the center of the bottom of the case where the thickness is a minimum so that the part 69 need not protrude far behind the case 11. This contributes to a reduction of the thickness of the mark plate 10.

A third embodiment of the invention will be described with reference to FIG. 16. In the third embodiment, socket mount parts 20 are provided on both end faces of the case 11 and the sockets 17 are mounted sideways so that the case 11 is made small in thickness. The remaining arrangement is substantially similar to that of the embodiment described with reference to FIGS. 3 through 12.

While the invention has been described with reference to the mark plate of an automobile, it goes without saying that the invention is not limited to such a device, and the technical concept of the invention is applicable to a variety of display devices.

As described above, in the display device of the invention, linear light sources are employed, and stipples are formed in the rear surface of the light conducting member in such a manner that the concentration thereof is smaller towards the light sources. Therefore, the display region of the display panel can be illuminated uniformly over its entire surface; that is, the display device of the invention attains a very good illumination effect. Furthermore, the rear surface of the light conducting member is bent in substantially an inverted-V shape so that the thickness of the light conducting member is larger towards the light sources from the center. Therefore, in the light conducting member, less light is absorbed, and when the light being repeatedly reflected between the front and rear surface of the light conducting member, exceeds the critical angle, it emerges from the front surface. Thus, the display device of the invention attains a high light utilization efficiency and provides illumination with a high luminance. Furthermore, in the display device for the invention, light incident portions are provided at the right and left ends of the light conducting member, and light sources are provided in respective ones of the light incident portions. Therefore, the thickness of the display device is not increased by the provision of the light sources; in other words, the display device can be decreased in thickness as much.

What is claimed is:

1. An automobile lighting device for use in a vehicle having a pair of tail lamps at a rear side thereof comprising:
   a decorative plate having an opening, said decorative plate adapted to be positioned between a pair of tail lamps of the vehicle whereby, said decorative plate is so arranged as to form a horizontally linear appearance with the pair of tail lamps;
   a case having an opening on the front side thereof, said case being positioned at a rear side of said decorative plate;
   a display panel having a display region, said display panel being coupled to said case in such a manner as to cover said front opening of said case, a part of said display panel being fitted in said opening of said decorative plate;
   a light conducting member arranged on a rear surface of said display panel, said light conducting member having at least one light incident part and a plurality of conically shaped stipples formed in a rear surface thereof in such a manner that said stipples increase in density from a position where said light incident part is located, said rear surface having flat areas between said stipples for reflecting light incident onto said flat areas towards the front surface of said light conducting member, whereby all regions on the front surface of said light conducting member are uniform in the amount of illumination per unit area; and
   lighting means arranged in said position of said light incident part,
   the rear surface of said light conducting member being linearly inclined with respect to said rear surface of said display panel.

2. The display device of claim 1, wherein said stipples increase in density in a stepwise manner towards said middle portion of said light conducting member.

3. The display device of claim 1, wherein said stipples increase in density in a smooth, continuous manner towards said middle portion of said light conducting member.

4. The display device of claim 1, wherein a diameter of said stipples increases towards said middle portion of said light conducting member to increase said density.

5. The display device of claim 1, wherein said stipples are arranged in a fundamental pattern of a regular hexagon.

6. The display device of claim 1, wherein the front surface of said decorative plate and the front surface of said display panel form one plane.

7. The display device of claim 1, wherein said light conducting member has a pair of light incident parts provided at respective both ends thereof, said stipples increasing in density towards a middle portion of said light conducting member from said light conducting member is substantially V-shaped in section and smaller in thickness towards the middle portion thereof from two ends where said light incident parts are located.

* * * * *